United States Patent Office 3,070,590
Patented Dec. 25, 1962

3,070,590
THREE COMPONENT INORGANIC CATALYST FOR THE POLYMERIZATION OF ETHYLENE
Alaric Louis Jeffrey Raum, Teddington, England, assignor to The Distillers Company Limited, Edinburgh, Scotland, a British company
No Drawing. Filed July 16, 1959, Ser. No. 827,451
Claims priority, application Great Britain Aug. 2, 1958
12 Claims. (Cl. 260—94.9)

The present invention relates to a process for the production of solid, substantially linear, high molecular weight polymers and co-polymers of ethylene and to the catalysts used in said process.

It is known that ethylene can be polymerised to give solid, substantially linear polymers by employing catalyst systems obtained by mixing certain metals with various other inorganic chemical compounds such as aluminium chloride and titanium tetrachloride. Many of these systems, although leading to the rapid polymerisation of ethylene, have the disadvantage that they may give rise to polymers of ethylene which are somewhat brittle owing to their relatively low molecular weights.

It is an object of the present invention to provide a process for the production of substantially linear polymers and co-polymers of ethylene having good physical properties. A further object is to provide a process for the polymerisation of ethylene which can be carried out by mixing entirely inorganic catalyst components with ethylene in an inert liquid medium.

According to the present invention the process for the polymerisation or copolymerisation of ethylene comprises subjecting ethylene in a liquid vehicle to an elevated temperature and an elevated pressure in the presence of a three component catalyst system formed from (1) aluminium (2) a titanium or vanadium tri- or di-halide or mixtures thereof and (3) a copper, silver or lead halide or mixtures thereof.

The aluminium is present as such or mixed with another metal in the form of an alloy. It is preferably present in a finely divided form, i.e. a form which provides a comparatively large surface area of metal for the amount taken. Most suitably aluminium powder or flitter and, particularly, ultra fine aluminium powder which has an average particle size of approximately 0.03 micron is used. The aluminium employed can be in an activated form. By activated is meant that the aluminium has been subjected to a final treatment in the absence of molecular oxygen which either removed absorbed or chemically combined oxygen from the metal, or formed new metallic surfaces by mechanical or chemical action. Subsequent to its final treatment, the activated metal retains its activity, provided that it is not allowed to come into contact with sufficient oxygen to inactivate all its oxygen-free surfaces formed by the treatment.

Any titanium or vanadium tri- or di-halide can be employed as the second component of the catalyst system. The preferred compounds are the chlorides of which vanadium trichloride and titanium trichloride give particularly good results. If desired mixtures of the various halide compounds can be used.

Titanium trichloride as normally prepared is in the form of a black or violet powder and such material, which is commercially available, can be used directly in the process of the present invention. Titanium trichloride can also be used in its metastable state in which it is in the form of a brown powder. Metastable titanium trichloride can be formed as a finely divided powder by passing titanium tetrachloride and hydrogen through a silent electric discharge at room temperature. The metastable titanium trichloride formed in this way is metastable because it is converted irreversibly to the black or violet stable form by the action of heat, for instance by heating to a temperature above 200° C.

The preferred third component of the catalyst system is chosen from the chlorides of lead, silver and copper, especially anhydrous cupric chloride. If desired mixtures of copper, lead and silver halides may be employed.

Active catalysts are obtained when the relative quantities of the various components of the catalyst mixture are varied over a wide range. It is, however, preferred that the molar proportion of aluminium present should amount to at least one third, and, preferably at least two thirds, of the molar total of the other two components forming the catalyst mixture.

There is no upper limit to the amount of aluminium present in the catalyst mixture and good yields of polymer can be obtained from catalyst mixtures containing as much as 30 molar proportions of aluminium to each combined molar proportion of the other two components. However, it is undesirable to increase the amount of aluminium to such an extent that considerable quantities of the metal are left in the polyethylene because of the difficulties of its removal. Generally it is unnecessary to employ more than 3 molar proportions of aluminium to each combined molar proportion of the other ingredients of the catalyst system.

Suitable molar ratios of component 1 to component 2 to component 3 are within the range 1-5:1:0.1-2. The preferred molar ratios are within the range 2-4:1:0.3-1. Generally it is preferred that the concentration of the titanium or vanadium tri- or di-halide in the initial reaction mixture should be from 0.1 to 5% by weight.

The process of the present invention is carried out with various components of the reaction mixture dispersed throughout a liquid vehicle. Good dispersion aids the polymerisation and preferably the pressure reaction vessel is fitted with an efficient stirring mechanism. Any liquid vehicle which does not inhibit the polymerisation reaction can be employed and liquids which are solvents for ethylene are preferred. The most suitable liquid vehicles are the normal paraffins such as normal pentane, hexane and decane, and higher boiling petroleum fractions which are substantially free of aromatic compounds. Alicyclic compounds such as cyclohexane are very suitable. Liquid branched chain paraffins, liquid aromatic compounds and most other liquid hydrocarbons can also be used as vehicles in which to carry out the process of the present invention.

The charging of the pressure vessel with the various ingredients of the reaction mixture and the subsequent polymerisation is preferably carried out in the absence of carbon dioxide, carbon monoxide, acetylene and water. In the process of the present invention trace quantities of these compounds can be tolerated but large quantities of any of them must be avoided. Most suitably the charging of the pressure vessel is carried out in an atmosphere of an inert gas, for example nitrogen or argon, or under an atmosphere of ethylene. Excess oxygen is a poison to the polymerisation of ethylene according to the process of the present invention and it is preferred to carry out the polymerisation in the absence of oxygen. Trace quantities of oxygen can, however, be tolerated but large quantities should be avoided.

The polymerisation of ethylene according to the present invention is initiated by increasing the temperature and pressure of the ethylene in a suitable pressure vessel until polymerisation occurs. The precise conditions under which polymerisation commences vary widely according to the components of the reaction mixture.

Once polymerization has begun the temperature and pressure of the reaction mixture may be suitably maintained at a constant level, the pressure preferably being maintained by addition of more ethylene. Suitable temperatures for polymerisation are between 70 and 200° C. Good results are obtained by carrying out the reaction at a temperature between 90 and 180° C., particularly between 110 and 160° C. It is possible, and in some cases advantageous, to initiate the polymerisation at a comparatively high temperature, for instance 160 to 200° C. and then allow the polymerisation to continue at a lower temperature, for instance 70 to 110° C.

The reaction may be carried out at elevated, i.e. superatmospheric, pressures less than 150 pounds per square inch, but it is generally preferred that pressures between 150–1,000 pounds per square inch be employed. It is also possible, and for some purposes advantageous, to initiate the polymerisation at a comparatively high pressure, for example greater than 500 pounds per square inch and then continue the reaction at a lower pressure.

The procedures in which high initial temperatures and pressure are employed are particularly useful on an industrial scale when the reaction is carried out in a series of reaction vessels at decreasing pressures and/or temperatures.

The use of pure ethylene gives rise to excellent homopolymers according to the process of the present invention. The term "pure" as used in connection with ethylene as a starting material for the polymerisation process of the present invention is intended to convey that there is a substantial absence of other olefins, oxygen, carbon dioxide and water, but if desired the ethylene may be replaced by a mixture of ethylene with other normally gaseous hydrocarbons. The gaseous hydrocarbons may contain other α-olefins such as propylene or 1-butene when copolymers will be formed. It should be noted that if copolymers of ethylene and other α-olefins are to be prepared according to the process of the present invention it is often necessary to employ a much higher concentration of the other α-olefin than ethylene in the feed to the polymerisation vessel than would be indicated by the composition it is desired that the copolymer should possess. This is necessary in order to allow for the fact that ethylene polymerises rather more rapidly under the conditions of the process of the present invention than do other α-olefins such, for example, as propylene.

The isolation of the polymers or copolymers may be carried out by any of the methods described in the literature for similar products. In particular it is preferred to wash the polymer with an alcohol, such as ethanol or propanol, before it is allowed to come into contact with air. It is also preferred to treat the polymer with a mineral acid such as hydrochloric acid, for instance, by treating it at reflux temperature with an alcohol/hydrochloric acid mixture, followed by a washing stage with the alcohol alone.

The following examples illustrate particular embodiments of the process of the present invention, the parts by weight (p.b.w.) and the parts by volume (p.b.v.) having the same relationship to each other as do kilograms to litres. The inherent viscosities of the polymers given in the examples is expressed as $$\eta_I = \frac{1}{C} \log_e \frac{tc}{to}$$

where C is the concentration of polymer in grams per 100 millilitres at 20° C.; $tc$ is the flow time of the polymer solution at 125° C. in seconds and $to$ is the flow time of the pure solvent at 125° C. The viscosity measurements were made on a 0.15% w./v. solution of polymer in tetralin at 125° C., using modified Ostwald viscometers.

*Example 1*

0.55 p.b.w. of aluminium $a$, 1.02 p.b.w. of α (violet)-titanium trichloride $b$, 0.46 p.b.w. of anhydrous cupric chloride $c$ and 300 p.b.v. of cyclohexane were added to a stainless steel high pressure reactor having a capacity of 800 p.b.v. and fitted with a magnetically operated stirrer. The molar proportions of $a:b:c$ were 3:1:0.5. The free space in the reactor was filled with ethylene substantially free from oxygen and the pressure thereof was slowly increased to 650 lbs./sq. in. while the temperature of the reaction mixture was slowly raised to 140° C. More ethylene was added as necessary to maintain the pressure and the reaction was allowed to continue for 180 minutes after the temperature of the reaction mixture had reached 100° C.

After the reaction the polymer was removed from the reactor, macerated to fine particles and treated with ethanolic hydrochloric acid at the reflux temperature. The product was finally washed with pure boiling ethanol.

39.5 p.b.w. of high molecular weight, linear polyethylene was produced which was particularly useful in the production of moulded articles. It had a $\eta_I$ value of 3.050.

*Example 2*

The procedure of Example 1 was repeated using the following ingredients:

| | P.b.w. | Molar proportions |
|---|---|---|
| Aluminium | 0.53 | 3.04 |
| α(violet)-titanium trichloride | 1.01 | 1 |
| Cuprous chloride | 0.33 | 0.51 |

13.5 p.b.w of solid, linear polyethylene was obtained. It had a $\eta_I$ value of 5.056.

*Example 3*

The stainless steel reactor described in Example 1 was charged with 0.52 p.b.w. of aluminium $a$, 1.01 p.b.w. of vanadium trichloride $b$, 0.43 p.b.w. of anhydrous cupric chloride $c$ and 300 p.b.v. of cyclohexane. The molar ratio of $a:b:c$ was 3:0.5:1. The reactor was charged with pure ethylene to a pressure of 250 lbs./sq. in. The temperature was then raised to 140° C. and more ethylene was admitted taking the pressure to 650 lbs./sq. in., at which level it was maintained until the end of the reaction. The total time for which the reactor was at a temperature above 100° C. was 3 hours.

The product obtained from this reaction was isolated by treating the macerated reaction mixture with ethanol and hydrochloric acid under reflux and filtering. The polymer was then further extracted with ethanol in a Sohxlet apparatus and finally dried in a vacuum oven.

57.5 p.b.w. of high molecular weight, linear polyethylene was obtained. This polymer could be pressed into tough films at 150° C. or moulded into specimens which possessed a high impact strength. It had a $\eta_I$ value of 1.541.

*Example 4*

The procedure of Example 3 was repeated using the following catalyst components:

| | P.b.w. | Molar proportions |
|---|---|---|
| Aluminium | 0.69 | 3 |
| Titanium dichloride | 1.01 | 1 |
| Cupric chloride | 0.58 | 0.5 |
| 300 p.b.v. of cyclohexane. | | |

26.0 p.b.w. of high molecular weight, linear polyethylene was obtained having a $\eta_I$ value of 4.760.

*Example 5*

0.53 p.b.w. of aluminium $a$, 1.00 p.b.w. of α (violet)-titanium trichloride $b$, 0.91 p.b.w. of anhydrous lead chloride $c$ and 300 p.b.v. of cyclohexane were added to the stainless steel high pressure reactor described in Example 1. The molar proportions of the catalyst components $a:b:c$ were 3:1:0.5. The free space in the reactor was filled with ethylene substantially free from oxygen and the pressure thereof was slowly increased to 650 lbs./sq. in., while the temperature of the reaction mixture was slowly raised to 140° C. More ethylene was added as necessary to maintain the pressure and the reaction was allowed to continue for 180 minutes after the temperature of the reaction mixture had reached 100° C.

After the reaction the polymer was removed from the reactor, macerated to fine particles and treated with ethanolic hydrochloric acid at the reflux temperature. The product was finally washed with pure boiling ethanol.

2.5 p.b.w. of high molecular weight, linear polyethylene was produced. It had a $\eta_I$ value of 4.101.

*Example 6*

The procedure of Example 5 was repeated using the following ingredients:

|  | P.b.w. | Molar proportions |
|---|---|---|
| Aluminium | 0.53 | 3.3 |
| α(violet)-titanium trichloride | 1.00 | 1 |
| Silver chloride | 0.47 | 0.5 |

16.5 p.b.w. of solid, linear polyethylene was obtained ($\eta_I = 1.396$).

*Examples 7 to 13*

The procedure of Example 1 was repeated but the polymerisation pressure, temperature and time, and the catalyst components were varied. In addition the aluminium used in Examples 9, 10, 11, 12 and 13 was milled in an inert atmosphere in cyclohexane for 20, 68, 20, 17 and 17 hours respectively. In Example 13 the temperature rose exothermically to 155° C. but the reaction vessel was cooled to reduce the polymerisation temperature to 120° C. at which value it was maintained. The results obtained from the various systems are given in the following table.

| Example No. | 7 | 8 | 9 | 10 | 11 | 12 | 13 |
|---|---|---|---|---|---|---|---|
| (a) Aluminium, p.b.w. | 0.54 | 0.55 | 4.85 | 0.48 | 0.07 | 0.24 | 0.48 |
| (b) TiCl₃, p.b.w. | 0.99 | 1.04 | | | | | |
| V Cl₃, p.b.w. | | | 0.94 | 0.95 | 4.01 | 0.48 | 0.96 |
| (c) CuCl₂, p.b.w. | | | 0.82 | 8.12 | 0.34 | 0.43 | 0.82 |
| CuBr, p.b.w. | | 0.48 | | | | | |
| CuBr₂, p.b.w. | 0.72 | | | | | | |
| Molar ratios (a):(b):(c) | 3.1:1:0.5 | 3:1:0.6 | 30:1:1 | 3:1:10 | 1:10:1 | 3:1:1 | 3:1:1 |
| Temperature, ° C. | 140 | 140 | 140 | 140 | 140 | 140 | 120 |
| Pressure, p.s.i. | 650 | 650 | 400 | 400 | 400 | 400 | 600 |
| Time above 100° C. in minutes | 180 | 180 | 180 | 180 | 180 | 180 | 180 |
| Yield, p.b.w. | 10.5 | 4.0 | 40.5 | 7.8 | 32.5 | 32 | 45 |
| $\eta_I$ | 7.017 | 4.428 | 3.020 | | 3.929 | 2.999 | 5.492 |

The following examples show the preparation of copolymers according to the present invention.

*Example 14*

The procedure of Example 1 was repeated using a catalyst system formed from

|  | P.b.w. | Molar ratios |
|---|---|---|
| Aluminium | 0.48 | 3 |
| Vanadium trichloride | 0.95 | 1 |
| Cupric chloride | 0.41 | 0.5 |

The aluminium was milled in cyclohexane under nitrogen for 17 hours. A mixture of ethylene and butadiene in a molar ratio of approximately 5:1 was added to the polymerisation vessel and the polymerisation was carried out at 120° C. at a pressure of 540 to 580 p.s.i.g. 6 p.b.w. of copolymer was obtained.

*Example 15*

The procedure of Example 1 was repeated using a catalyst system formed from

|  | P.b.w. | Molar ratios |
|---|---|---|
| Aluminium | 0.49 | 3 |
| Vanadium trichloride | 0.94 | 1 |
| Cupric chloride | 0.41 | 0.5 |

The aluminium was milled in cyclohexane under nitrogen for 17 hours before use. A mixture of ethylene and isoprene in a molar ratio of approximately 2.5:1 was admitted to the polymerisation vessel and the polymerisation was carried out at 120° C. at a pressure of 560 to 620 p.s.i.g. A yield of 11.5 p.b.w. of copolymer was obtained.

*Example 16*

The procedure of Example 1 was repeated using a catalyst system formed from

|  | P.b.w. | Molar ratios |
|---|---|---|
| Aluminium | 0.80 | 3 |
| Titanium trichloride | 1.49 | 1 |
| Cupric chloride | 0.65 | 0.5 |

The aluminium was milled in cyclohexane under nitrogen for 65 hours before use. After the catalyst components had been added to the polymerisation vessel together with the cyclohexane, propylene was admitted to a pressure of 100 p.s.i.g. at 33° C. The vessel was then heated to 140° C. and the pressure increased to 570 p.s.i.g. It slowly decreased to 350 p.s.i.g. owing to the polymerisation of propylene to give low molecular weight polymer. Ethylene was then admitted to a pressure of 520 p.s.i.g. and the temperature maintained at 140° C. A yield of 3.45 p.b.w. of a solid copolymer, having a $\eta_I$ value of 5.299, was obtained.

*Example 17*

The process of Example 1 was repeated using a catalyst formed from

|  | P.b.w. | Molar ratio as |
|---|---|---|
| Aluminium | 0.48 | 3 |
| Vanadium trichloride | 0.94 | 1 |
| Cupric chloride | 0.80 | 1 |

The aluminium was milled in cyclohexane under nitrogen before use. An ethylene/propylene mixture having an approximate molar ratio of 1:1 was admitted to the polymerisation vessel which was heated to 140° C. The pressure increased to 515 p.s.i.g. and then decreased to 180 p.s.i.g. as polymerisation occurred. The total time for which the monomer mixture was above 100° C. was 180 minutes. A yield of 22 p.b.w. of copolymer having a $\eta_{\text{I}}$ value of 2.909 was obtained.

The polymers and copolymers produced according to the process of the present invention are exceedingly valuable thermoplastic materials. The materials obtained are substantially linear, high molecular weight products which can be used for any of the purposes for which previously obtainable linear polyethylene and linear copolymers of ethylene have been used. The polymers and copolymers can be extruded to give, for example, tubes, moulded to give, for example, containers of all types or formed into sheets or thin films.

I claim:

1. A composition obtained by mixing (a) aluminum, (b) α-titanium trichloride and (c) anhydrous cupric chloride, the molar ratio of a:b:c being within the range of 1 to 5:1:0.1 to 2.

2. A composition obtained by mixing (a) aluminum, (b) α-titanium trichloride and (c) cuprous chloride, the molar ratio of a:b:c being within the range of 1 to 5:1:0.1 to 2.

3. A composition obtained by mixing (a) aluminum, (b) vanadium trichloride and (c) anhydrous cupric chloride, the molar ratio of a:b:c being within the range of 1 to 5:1:0.1 to 2.

4. A composition obtained by mixing (a) aluminum, (b) titanium dichloride and (c) cupric chloride, the molar ratio of a:b:c being within the range of 1 to 5:1:0.1 to 2.

5. A composition obtained by mixing (a) aluminum, (b) α-titanium trichloride and (c) anhydrous lead chloride, the molar ratio of a:b:c being within the range of 1 to 5:1:0.1 to 2.

6. A composition obtained by mixing (a) aluminum, (b) α-titanium trichloride and (c) silver chloride, the molar ratio of a:b:c being within the range of 1 to 5:1:0.1 to 2.

7. A composition obtained by mixing (a) aluminum, (b) titanium trichloride and (c) cupric bromide, the molar ratio of a:b:c being within the range of 1 to 5:1:0.1 to 2.

8. A composition obtained by mixing (a) aluminum, (b) titanium trichloride and (c) cuprous bromide, the molar ratio of a:b:c being within the range of 1 to 5:1:0.1 to 2.

9. A process for the catalytic polymerization of ethylene which comprises contacting ethylene in an inert hydrocarbon vehicle and under polymerization conditions with a three component catalyst system formed from admixing (1) aluminum, (2) at least one compound selected from the group consisting of titanium dichloride, titanium trichloride and vanadium trichloride and (3) at least one halide, selected from the group consisting of chlorides and bromides, of a member selected from the group consisting of copper, silver and lead, the molar ratio of 1:2:3 being within the range of 1–5:1:0.1–2.

10. A process for the catalytic polymerization of ethylene which comprises contacting ethylene in an inert hydrocarbon vehicle and under polymerization conditions with a three component catalyst system formed from admixing (1) aluminum, (2) at least one compound selected from the group consisting of titanium dichloride, titanium trichloride and vanadium trichloride and (3) at least one halide, selected from the group consisting of chlorides and bromides, of a member selected from the group consisting of copper, silver and lead, the molar ratio of 1:2:3 being within the range of 2–4:1:0.3–1.

11. A polymerization catalyst formed from (1) 1 to 5 molar proportions of aluminum, (2) one molar proportion of at least one compound selected from the group consisting of titanium dichloride, titanium trichloride and vanadium trichloride and (3) 0.1 to 2 molar proportions of at least one halide, selected from the group consisting of chlorides and bromides, of a member selected from the group consisting of copper, silver and lead.

12. A process for the catalytic polymerization of ethylene which comprises contacting ethylene in an inert hydrocarbon vehicle and under polymerization conditions with a three-component catalyst system formed from admixing (1) aluminum, (2) metastable titanium trichloride and (3) at least one halide, selected from the group consisting of chlorides and bromides, of a member selected from the group consisting of copper, silver and lead, the molar ratio of 1:2:3 being within the range of 1 to 5:1:0.1 to 2.

References Cited in the file of this patent

UNITED STATES PATENTS

| | | |
|---|---|---|
| 2,886,561 | Reynolds et al. | May 12, 1959 |
| 2,888,448 | Gresham et al. | May 26, 1959 |
| 2,899,413 | Hagemeyer et al. | Aug. 11, 1959 |
| 2,980,664 | Stuart | Apr. 18, 1961 |

FOREIGN PATENTS

| | | |
|---|---|---|
| 795,177 | Great Britain | May 21, 1958 |
| 1,132,506 | France | Nov. 5, 1956 |
| 1,147,868 | France | June 11, 1957 |